United States Patent Office 2,972,597
Patented Feb. 21, 1961

2,972,597

STABILIZED POLY-α-OLEFIN COMPOSITIONS

Gordon C. Newland and John W. Tamblyn, Kingsport, Tenn., assignors to Eastman Kodak Company, Rochester, N.Y., a corporation of New Jersey No Drawing. Filed Nov. 13, 1958, Ser. No. 773,568

6 Claims. (Cl. 260—45.85)

This invention relates to the stabilization of poly-α-olefin compositions. Preferred embodiments of the invention relate to the stabilization of polyethylene and polypropylene compositions against deterioration resulting from exposure to sunlight or ultraviolet light with a novel synergistic combination of stabilizers.

Poly-α-olefins such as polyethylene, polypropylene and the like are subject to photo-oxidation when exposed to sunlight. This oxidation is characterized in its earlier stages by the breaking of the polymer chain and the formation of carbonyl groups in the polymer's molecule. As the oxidation continues, the polymer cracks and loses tensile strength to the point of mechanical failure. A number of so-called ultraviolet inhibitors are known which inhibit the photo-degradation of many polymers, resins or plastics. However, many effective stabilizers for halogen-containing polymers such as polyvinyl chloride, polyvinylidene chloride and the like are not effective stabilizers in poly-α-olefins, as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to be synergistic stabilizers for poly-α-olefin compositions short of actually testing the combination in a poly-α-olefin composition, even though the individual components comprising the combination may be well-known stabilizers for various polymers, resins or plastics including poly-α-olefin compositions.

Apart from the fact that it is an unexpected technological discovery when two stabilizers are found that will synergize with each other in poly-α-olefin compositions, there are certain practical commercial advantages that often times accompany the use of such combinations of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer, and still be able to obtain good stabilization through the synergism of the stabilizer combination. In addition, one of the stabilizers of a combination that synergizes with another stabilizer to produce improved resistance to deterioration from ultraviolet light might also serve as an effective stabilizer against discoloration or other degradation due to high temperature processing methods or to the use of the poly-α-olefin composition under relatively high temperatures. Thus, it is highly desirable in the poly-α-olefin art to have available synergistic combinations of two or more stabilizers.

It is an object of this invention to provide a new synergistic combination of stabilizers for poly-α-olefin compositions.

It is another object of this invention to provide novel polyethylene and polypropylene compositions containing a synergistic combination of compounds that improves the stability of the polyethylene and polypropylene compositions against deterioration resulting from exposure to sunlight or ultraviolet light.

It is also an object of this invention to provide novel poly-α-olefin compositions of improved stability in thin film form.

Other objects of the invention will be apparent from the description and claims that follow.

The present invention comprises poly-α-olefin compositions having incorporated therein a synergistic stabilizer combination comprising (1) a 4-alkoxy-2-hydroxybenzophenone, and (2) a diester of β,β'-thiodipropionic acid.

The 4-alkoxy-2-hydroxybenzophenone component of the present combination has the following formula

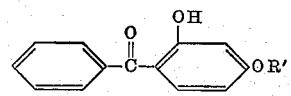

wherein R' is an alkyl group having 12 to 14 carbon atoms. Suitable 4-alkoxy-2-hydroxybenzophenone compounds are 4-dodecyloxy-2-hydroxybenzophenone, 4-tridecyloxy-2-hydroxybenzophenone, and 4-tetradecyloxy-2-hydroxybenzophenone. Likewise, mixtures of these compounds can be employed in accordance with the invention. Such compounds are described in Lappin and Tamblyn application U.S. Serial No. 694,906 filed November 7, 1957, now Patent 2,861,053, as being effective stabilizers in poly-α-olefins against deterioration from ultraviolet light. When combined with an ester of β,β'-thiodipropionic acid, the described 4-alkoxy-2-hydroxybenzophenones produce a stabilizing effect in poly-α-olefins that is greater than the additive or aggregative stabilizing effect of these individual stabilizers. Such combinations are generally referred to as synergistic combinations.

The diester of β,β'-thiodipropionic acid comprising the present synergistic combination has the following formula

wherein R is an alkyl radical having 8 to 18 carbon atoms. The preferred ester has eleven carbons for the substituent R, namely, dilauryl β,β'-thiodipropionate. However, any diester of β,β'-thiodipropionic acid as described above can be employed in the present stabilizer combination including the octyl, nonyl, decyl, tridecyl, myristyl, pentadecyl, cetyl, heptadecyl, and stearyl diesters of β,β'-thiodipropionic acid, or mixtures thereof.

The combination of 4-alkoxy-2-hydroxybenzophenones and diesters of β,β'-thiodipropionic acid as described above can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, although such poly-α-olefins as poly 4-methylpentene-1, poly 3-methylbutene-1 and related homologues are included in the invention. Both the so-called "low density" and "high density" poly-α-olefin compositions can be stabilized in accordance with the invention. Reference is made to Fawcett et al. U.S. Patent No. 2,153,553 granted April 11, 1939, and to copending applications Coover U.S. Serial No. 559,536 filed January 17, 1956 and Coover et al. U.S. Serial No. 724,904 filed March 31, 1958, with regard to the preparation of various poly-α-olefin compositions that can be stabilized against ultraviolet deterioration with the subject stabilizer combination. The subject stabilizer combination can be used as an ultraviolet inhibitor for the more common solid resinous poly-α-olefin composition having average molecular weights of at least 15,000 and more usually at least 20,000, as well as the so-called poly-α-olefin waxes having lower molecular weights.

The amount of the combination of the 4-alkoxy-2-hydroxy-benzophenone and the diester of β,β'-thiodipropionic acid employed in poly-α-olefin compositions in accordance with the invention can be widely varied, the stabilizing amount of this combination usually varying with the particular use to which the poly-α-olefin is to be put. Concentrations of the combination of at least .001% are used, with concentrations of .001% to 10% being generally used, and with concentrations of .005% to 5% being preferably used, the concentration being based on the weight of the poly-α-olefin. The weight ratios of the two stabilizers comprising the subject synergistic combination likewise can be varied. We generally utilize the combination of the subject two stabilizers at a weight ratio of the diester of β,β'-thiodipropionic acid to the 4-alkoxy-2-hydroxybenzophenone in the range of 1/30 to 30/1, and preferably 1/10 to 10/1.

The stabilizer combination of the invention can be incorporated or blended into poly-a-olefin compositions by any of the conventional methods used for blending such materials into resins or plastics. Typical of such methods that can be suitably employed include milling on heated rolls, deposition from solvents and dry-blending. The stabilizers of the invention can be incorporated separately or together into the poly-α-olefin composition.

The stabilizer combination of the present invention lends to poly-α-olefin compositions improved stability, and more specifically, improved stability against deterioration resulting from exposure to sunlight or ultraviolet light. The diester of β,β'-thiodipropionic acid of the subject combination also lends to poly-α-olefinic compositions a substantial thermal stability. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded, rolled or molded into sheets, rods, tubes, piping, filaments and other shaped articles, including widely used films of the polymer about 0.5 to 100 mils in thickness. The present composition can be used for coating paper, cloth, wire, metal foil, glass fiber fabrics, synthetic and natural textiles and other such material. Likewise, small amounts of other additives such as are commonly added to poly-α-olefins for specific uses are not deleterious to the effectiveness of the present synergistic combination. For example, the present synergistic combination can be used to stabilize a typical polyethylene composition used for coating paper containing a small amount of a terpene or pinene resin such as about 5% "Piccolyte S-115-L" (Pennsylvania Industrial Chemical Corporation). Also, other stabilizers, inhibitors or the like can be employed in the present poly-α-olefin compositions if desired.

The invention is illustrated by the following examples of preferred embodiments thereof.

EXAMPLE 1

Polyethylene samples containing .5% by weight of dilauryl β,β'-thiodipropionate plus 1% by weight of 4-dodecyloxy-2-hydroxybenzophenone, as well as these two stabilizers individually and a control containing no stabilizer additive for comparative purposes, were subjected to an outdoor weathering test. The various additives were incorporated into polyethylene having an average molecular weight of about 30,000 and a density of 0.918 by milling on heated rollers in accordance with usual practice. Thereafter the polyethylene was compression molded into films about 60 mils in thickness. Samples of the resulting films containing the various additives and the control sample containing no additive were exposed to outdoor weathering on a rack facing south at an angle with the horizontal of 36.5° at Kingsport, Tennessee. The progress of the deterioration due to exposure to the various samples was followed by determining the carbonyl formation as measured by infrared absorption in the 5.82 mμ region. The determination of the carbonyl increase in poly-α-olefin polymers gives an early and reliable indication of the breaking down of the polymer. Reference is made to the following two references concerning the determination of carbonyl content by infrared measurement: Rugg, Smith and Bacon, J. Polymer Sci., 13, 535(1954), and Cross, Richards and Willis, Discussions Faraday Soc., No. 9, 235(1950). The time in months required for the formation of 10 arbitrary units of carbonyl, enough to cause substantial deterioration in the electrical properties of the poly-α-olefin composition, were recorded and summarized in Table 1 below.

*Table 1*

| Additive | Exposure Time in Months to Produce 10 Units of Carbonyl |
| --- | --- |
| (1) None | 1 |
| (2) .5% Dilauryl β,β'-Thiodipropionate | 2 |
| (3) 1% 4-Dodecyloxy-2-Hydroxybenzophenone | 18 |
| (4) .5% Dilauryl β,β'-Thiodipropionate + 1% 4-Dodecyloxy-2-Hydroxybenzophenone | >29 |

As can be observed from the data set out in Table 1, the combination of dilauryl β,β'-thiodipropionate and dodecyloxy-2-hydroxybenzophenone is a stabilizer combination which has a stabilizing effect greater than the additive or aggregative effect of these individual stabilizers. Similar results are obtained with a combination of .5% by weight of dilauryl β,β'-thiodipropionate and 1% by weight of 4-tetradecyloxy-2-hydroxybenzophenone in a film of polyethylene tested as described above.

EXAMPLE 2

Polypropylene having an average molecular weight of about 110,000 and a density of 0.917 having .5% by weight of dilauryl β,β'-thiodipropionate plus 1% by weight of 4-dodecyloxy-2-hydroxybenzophenone, as well as these two stabilizers individually, incorporated therein by extrusion-compounding in accordance with usual practice was extruded into films 20 mils thick and thereafter cut into 2.5 x .5 inch samples. A like sample containing no stabilizer additive was prepared. The prepared samples were exposed in an Atlas Twin-Arc Weather-Ometer as described in Anal. Chem., 25, 460(1953) that was modified by the addition of 10 Westinghouse 20 watt fluorescent sunlamps. Exposure damage to the samples of polypropylene was assessed by the physical appearance of the exposed surface after 450 hours of exposure and with respect to change of flexural strength after 600 hours of exposure as summarized by the data in Table 2 below.

Table 2

| Additive | Percent Initial Flexural Strength Left After 600 Hours' Exposure | Appearance of Exposed Surface After 450 Hours' Exposure |
|---|---|---|
| (1) None | 0 | Crumbled to pieces. |
| (2) .5% Dilauryl β,β'-Thiodipropionate. | 0 | Dull, very brittle. |
| (3) 1% 4-Dodecyloxy-2-Hydroxybenzophenone. | 60 | Slightly crazed, on powdery layer surface. |
| (4) .5% Dilauryl β,β'-Thiodipropionate + 1% 4-Dodecyloxy-2-Hydroxybenzophenone. | 90 | Smooth, tough. |

The flexural strength referred to in Table 2 was determined by the Tour-Marshall Test (A.S.T.M. D747-43). In a similar manner a combination of .5% by weight of .5% dilauryl β,β'-thiodipropionate and 1% by weight of 4-tetradecyloxy-2-hydroxybenzophenone stabilizes polypropylene.

EXAMPLE 3

Polyethylene samples containing dilauryl β,β'-thiodipropionate and 4-dodecyloxy-2-hydroxybenzophenone, individually and in combination, were prepared and exposed to 14 months of outdoor weathering as described in Example 1. The exposed samples were tested for deterioration resulting from the weathering by elongation measurements of 2.5 x .5 inch test strips on an Instron Tensile Tester at a rate of stretch of 2,000% per minute. The test samples were conditioned one week at 73° F. at a relative humidity of 50%. The results of the tests are summarized by the data set out in Table 3 below.

Table 3

| Additive | Percent Original Elongation Retained After 14 Months of Exposure |
|---|---|
| (1) None | 9 |
| (2) .5% Dilauryl β,β'-Thiodipropionate | 11 |
| (3) 1% 4-Dodecyloxy-2-Hydroxybenzophenone | 80 |
| (4) .5% Dilauryl β,β'-Thiodipropionate + 1% 4-Dodecyloxy-2-Hydroxybenzophenone | 110 |

As evidenced from the elongation measurements described above, diesters of β,β'-thionipropionic acid and 4-alkoxy-2-hydroxybenzophenones as described cooperate in poly-α-olefin compositions to produce a synergistic stabilizing effect.

For purposes of comparison, we tested dilauryl thiodipropionate in combination with several other stabilizers including other hydroxybenzophenone compounds. Combinations composed of 1.5% by weight of dilauryl β,β'-thiodipropionate in combination with: 1.5% by weight of 3-benzoyl-2,4-dihydroxybenzophenone, or 1.5% by weight of 4,4'-dimethoxy-2-hydroxybenzophenone, or 1.5% by weight of tris (dimethylamino) phosphine oxide, were found not to be synergistic stabilizer combinations in polypropylene having an average molecular weight of about 120,000 and a density of 0.917 in 1/16 inch test films when exposed in the modified Atlas Twin-Arc Weather-Ometer described in Example 2.

The present invention thus provides novel poly-α-olefin compositions having improved stability against deterioration resulting from exposure to ultraviolet light, and particularly it provides novel synergistic stabilizer combinations for poly-α-olefin compositions.

Although the invention has been described in considerable detail with reference to preferred embodiments thereof, it will be understood that variations and modifications can be effected within the spirit and scope of the invention as described hereinabove and as defined by the appended claims.

We claim:

1. A solid poly-α-olefin composition comprising a solid poly-α-olefin prepared from an α-monoolefinic aliphatic hydrocarbon having 2 to 6 carbon atoms containing .001% to 10% by weight based on said poly-α-olefin of a stabilizer combination comprising a diester of β,β'-thiodipropionic acid having the formula

wherein R is an alkyl group containing 8 to 18 carbon atoms and a 4-alkoxy-2-hydroxybenzophenone having the formula

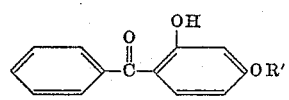

wherein R' is an alkyl group containing 12 to 14 carbon atoms, the weight ratio of said diester of β,β'-thiodipropionic acid to said 4-alkoxy-2-hydroxybenzophenone being in the range of 1/30 to 30/1.

2. A solid poly-α-olefin composition comprising a solid poly-α-olefin selected from the group consisting of polyethylene and polypropylene containing .001% to 10% by weight based on said poly-α-olefin of stabilizer combination comprising a diester of β,β'-thiodipropionic acid having the formula

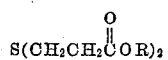

wherein R is an alkyl group containing 8 to 18 carbon atoms and a 4-alkoxy-2-hydroxybenzophenone having the formula

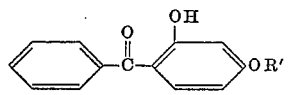

wherein R' is an alkyl group containing 12 to 14 carbon atoms, the weight ratio of said diester of β,β'-thiodipropionic acid to said 4-alkoxy-2-hydroxybenzophenone being in the range of 1/30 to 30/1.

3. A solid poly-α-olefin composition comprising a solid poly-α-olefin selected from the group consisting of polyethylene and polypropylene containing .001% to 10% by weight based on said poly-α-olefin of a stabilizer combination comprising dilauryl β,β'-thiodipropionate and a 4-alkoxy-2-hydroxybenzophenone selected from the group consisting of 4-dodecyloxy-2-hydroxybenzophenone and 4-tetradecyloxy-2-hydroxybenzophenone, the weight ratio of said dilauryl β,β'-thiodipropionate to said 4-alkoxy-2-hydroxybenzophenone being in the range of 1/30 to 30/1.

4. A solid polyethylene composition comprising solid polyethylene containing .005% to 5% by weight based on said polyethylene of a stabilizer combination comprising dilauryl β,β'-thiodipropionate and 4-dodecyloxy-2-hydroxybenzophenone, the weight ratio of said dilauryl β,β'-thiodipropionate to said 4-dodecyloxy-2-hydroxybenzophenone being in the range of 1/10 to 10/1.

5. A solid polypropylene composition comprising solid polypropylene containing .005% to 5% by weight based on said polypropylene of a stabilizer combination comprising dilauryl β,β'-thiodipropionate and 4-dodecyloxy-2-hydroxybenzophenone, the weight ratio of said dilauryl β,β'-thiodipropionate to said 4-dodecyloxy-2-hydroxybenzophenone being in the range of 1/10 to 10/1.

6. A solid poly-α-olefin composition comprising a solid poly-α-olefin selected from the group consisting of polyethylene and polypropylene in film form 0.5 to 100 mils in thickness containing .005% to 5% by weight based on said poly-α-olefin of a stabilizer combination comprising dilauryl β,β'-thiodipropionate and a 4-alkoxy-2-hydroxybenzophenone selected from the group consisting of 4-dodecyloxy-2-hydroxybenzophenone and 4-tetradecyloxy-2-hydroxybenzophenone, the weight ratio of said dilauryl β,β'-thiodipropionate to said 4-alkoxy-2-hydroxybenzophenone being in the range of 1/10 to 10/1.

References Cited in the file of this patent

UNITED STATES PATENTS

| | | |
|---|---|---|
| 2,568,902 | Thompson et al. | Sept. 25, 1951 |
| 2,861,053 | Lappin et al. | Nov. 18, 1958 |